(12) United States Patent
Masuda et al.

(10) Patent No.: US 9,007,741 B2
(45) Date of Patent: Apr. 14, 2015

(54) CAPACITOR

(71) Applicant: Taiyo Yuden Co., Ltd., Tokyo (JP)

(72) Inventors: Hidetoshi Masuda, Tokyo (JP); Yoshinari Take, Tokyo (JP)

(73) Assignee: Taiyo Yuden Co., ltd., Tokyo (JP)

( * ) Notice: Subject to any disclaimer, the term of this patent is extended or adjusted under 35 U.S.C. 154(b) by 129 days.

(21) Appl. No.: 13/910,228

(22) Filed: Jun. 5, 2013

(65) Prior Publication Data
US 2013/0329339 A1 Dec. 12, 2013

(30) Foreign Application Priority Data

Jun. 7, 2012 (JP) ................. 2012-129572

(51) Int. Cl.
| H01G 4/06 | (2006.01) |
| H01G 4/30 | (2006.01) |
| H01G 9/045 | (2006.01) |
| H01G 9/048 | (2006.01) |
| H01G 4/012 | (2006.01) |

(52) U.S. Cl.
CPC ................. *H01G 4/06* (2013.01); *H01G 4/302* (2013.01); *H01G 9/045* (2013.01); *H01G 9/048* (2013.01); *H01G 4/012* (2013.01)

(58) Field of Classification Search
USPC ............... 361/311, 312, 313, 301.2–301.4, 361/306.1–306.3, 321.1, 321.2
See application file for complete search history.

(56) References Cited

U.S. PATENT DOCUMENTS

| 6,856,501 | B2 * | 2/2005 | Matsuhashi | ................ 361/321.1 |
| 7,312,975 | B2 * | 12/2007 | Togashi et al. | ............. 361/321.1 |
| 7,826,195 | B2 * | 11/2010 | Oh | ............................. 361/301.4 |
| 7,903,387 | B2 * | 3/2011 | Masuda et al. | ................ 361/303 |
| 8,171,607 | B2 * | 5/2012 | Sasaki et al. | ................. 29/25.41 |
| 8,605,410 | B2 * | 12/2013 | Oikawa et al. | ................ 361/303 |

FOREIGN PATENT DOCUMENTS

JP         4493686 B2     4/2010

* cited by examiner

*Primary Examiner* — Nguyen T Ha
(74) *Attorney, Agent, or Firm* — Saliwanchik, Lloyd & Eisenschenk (57) ABSTRACT

A capacitor includes a dielectric layer, a first external electrode layer, a second external electrode layer, a first internal electrode portion, a second internal electrode portion, and an adsorbing portion. The first internal electrode portion is provided on a first through-hole portion, one end of the first internal electrode portion being connected to the first external electrode layer. The second internal electrode portion is provided on a second through-hole portion, one end of the second internal electrode portion being connected to the second external electrode layer. The adsorbing portion adsorbs the first external electrode layer and the second external electrode layer, the adsorbing portion being provided on a third through-hole portion.

4 Claims, 10 Drawing Sheets

CAPACITOR

CROSS-REFERENCE TO RELATED APPLICATION

This application claims priority under 35 U.S.C. §119 to Japanese Patent Application No. JP 2012-129572 filed on Jun. 7, 2012, the entire content of which is hereby incorporated herein by reference in its entirety.

FIELD

The present disclosure relates to a capacitor having a configuration in which a plurality of minute internal electrodes are filled in a dielectric layer.

BACKGROUND

As a capacitor used widely at present, for example, an Al-electrolytic capacitor or a laminated ceramic capacitor has been known. Because the Al-electrolytic capacitor uses an electrolyte solution, it needs countermeasures against liquid leakage and the like. Moreover, because the laminated ceramic capacitor is manufactured through a calcination treatment, it needs to solve various problems caused due to thermal contraction between an electrode and a dielectric.

On the other hand, in recent years, as a new capacitor, a capacitor in which an insulating layer obtained by applying an anodic oxidation treatment to aluminum oxide is used as a dielectric layer is proposed. For example, Japanese Patent No. 4493686 discloses a capacitor including a pair of conductor layers, a dielectric layer, a plurality of minute holes, and first and second internal electrodes, the dielectric layer being provided between the pair of conductor layers, the plurality of minute holes having a substantially columnar shape, the plurality of minute holes being formed so as to penetrate the dielectric layer in a direction substantially perpendicular to the pair of conductive layers, the first and second internal electrodes being filled in the plurality of holes. The first internal electrode is filled in a part of the plurality of holes. One end of the first internal electrode is electrically connected to one of the conductor layers, and the other end of the first internal electrode is insulated from the other conduct layer. The second internal electrode is filled in a hole out of the plurality of holes, which is not filled with the first electrode. One end of the second internal electrode is electrically connected to the other conductor layer, and the other end of the second internal electrode is insulated from the one layer.

The capacitor having such a configuration does not need an electrolyte solution or a calcination treatment. Therefore, it is possible to overcome the problem of the Al-electrolytic capacitor or laminated ceramic capacitor. Moreover, because the first and second internal electrodes to be filled in the dielectric layer have a nanoscale microstructure, the entire element can be downsized. Furthermore, because the first and second internal electrodes are connected to the pair of conductor layers in parallel, it is possible to increase the capacity of an element.

SUMMARY

In the capacitor disclosed in Japanese Patent No. 4493686, since the first and second internal electrodes have a nanoscale microstructure, the connection area of the first and second internal electrodes with the pair of conductor layers, which are formed on both surfaces of the dielectric layer, is only about 10% of the element area. The remaining 90% of the element area is the connection area between the dielectric layer and the conductor layers. In general, the bond between metal and ceramic is weaker than the bond between metal and metal. Therefore, the interface between the dielectric layer and the conductor layer may be removed due to an effect of stress or the like, thereby reducing the element properties.

In view of the circumstances as described above, it is desirable to provide a capacitor capable of improving the adhesiveness between the dielectric layer and the conductor layer.

According to an embodiment of the present disclosure, there is provided a capacitor including a dielectric layer, a first external electrode layer, a second external electrode layer, a first internal electrode portion, a second internal electrode portion, and an adsorbing portion.

The dielectric layer includes a first surface, a second surface facing the first surface, and a plurality of through-holes communicating between the first surface and the second surface.

The first external electrode layer is disposed on the first surface.

The second external electrode layer is disposed on the second surface.

The first internal electrode portion is provided on a first through-hole portion, the first through-hole portion being a part of the plurality of through-holes, one end of the first internal electrode portion being connected to the first external electrode layer, the other end of the first internal electrode portion being insulated from the second external electrode layer.

The second internal electrode portion is provided on a second through-hole portion, the second through-hole portion being another part of the plurality of through-holes, one end of the second internal electrode portion being connected to the second external electrode layer, the other end of the second internal electrode portion being insulated from the first external electrode layer.

The adsorbing portion is provided on a third through-hole portion, the adsorbing portion adsorbing the first external electrode layer and the second external electrode layer, the third through-hole portion being the remaining portion of the plurality of through-holes.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIGS. 8A and 8B are each a schematic cross-sectional view for explaining the operation of the capacitor shown in FIG. 7, FIG. 8A shows an example in which a conductor is not arranged in a hole, and FIG. 8B shows an example in which a conductor is arranged in a hole;

DETAILED DESCRIPTION OF THE EMBODIMENTS

A capacitor according to an embodiment of the present disclosure includes a dielectric layer, a first external electrode layer, a second external electrode layer, a first internal electrode portion, a second internal electrode portion, and an adsorbing portion.

The dielectric layer includes a first surface, a second surface facing the first surface, and a plurality of through-holes communicating between the first surface and the second surface.

The first external electrode layer is disposed on the first surface.

The second external electrode layer is disposed on the second surface.

The first internal electrode portion is provided on a first through-hole portion, the first through-hole portion being a part of the plurality of through-holes, one end of the first internal electrode portion being connected to the first external electrode layer, the other end of the first internal electrode portion being insulated from the second external electrode layer.

The second internal electrode portion is provided on a second through-hole portion, the second through-hole portion being another part of the plurality of through-holes, one end of the second internal electrode portion being connected to the second external electrode layer, the other end of the second internal electrode portion being insulated from the first external electrode layer.

The adsorbing portion is provided on a third through-hole portion, the adsorbing portion adsorbing the first external electrode layer and the second external electrode layer, the third through-hole portion being the remaining portion of the plurality of through-holes.

In the capacitor, the first and second external electrode layers are deposited on the first and second surfaces of the dielectric layer, respectively, in a negative pressure atmosphere, thereby forming the adsorbing portion having a negative pressure space. Accordingly, by the adsorbing portion, the first and second external electrode layers are adsorbed on the first and second surfaces of the dielectric layer. Therefore, according to the capacitor, it is possible to improve the adhesiveness between the dielectric layer and the first and second external electrode layers.

The adsorbing portion may include a filing body, the filling body including a first end portion and a second end portion. The first end portion faces the first external electrode layer via a first cavity portion maintained in a negative pressure state. The second end portion faces the second external electrode layer via a second cavity portion maintained in a negative pressure state. Accordingly, the first and second external electrode layers are brought into close contact with the first and second surfaces of the dielectric layer via the first and second cavity portions, respectively.

The filling body may include a conductor. Accordingly, it is possible to increase the capacitance between the first and second internal electrode portions, which face each other and sandwich the negative pressure space therebetween. Therefore, it is possible to increase the full capacity of the capacitor.

The first external electrode layer and the second external electrode layer may include a metal sputtering film or a deposition film. These films are formed in a negative pressure atmosphere. After the deposition, the third through-hole portion is hermetically sealed by the first and second external electrode layers. Therefore, the third through-hole portion can be easily maintained in a negative pressure state.

A method of manufacturing a capacitor according to an embodiment of the present disclosure includes forming a dielectric layer by causing a metal base material to be anodically oxidized, the dielectric layer including a plurality of through-holes.

A first internal electrode portion is formed on a first through-hole portion, one end of the first internal electrode portion reaching a first surface of the dielectric layer, the first through-hole portion being a part of the plurality of through-holes.

A second internal electrode portion is formed on a second through-hole portion, one end of the second internal electrode portion reaching a second surface of the dielectric layer, the second through-hole portion being another part of the plurality of through-holes.

A first external electrode layer is deposited on the first surface by a method in which deposition is performed in a negative pressure atmosphere, the first external electrode layer being connected to the first internal electrode portion.

A second external electrode layer is deposited on the second surface by a method in which deposition is performed in a negative pressure atmosphere, the second external electrode layer being connected to the second internal electrode portion, while an adsorbing portion is formed on a third through-hole portion, the adsorbing portion having a negative pressure space, the third through-hole portion being the remaining portion of the plurality of through-holes.

In the manufacturing method, it is possible to form the adsorbing portion simultaneously with the step of forming the first and second external electrode layers. Accordingly, it is possible to easily produce a capacitor having excellent durability.

The step of forming the adsorbing portion may be arbitrarily set depending on the configuration of the adsorbing portion. For example, the adsorbing portion includes holes maintained in a negative pressure state, the step of forming the adsorbing portion includes forming a hollow portion in the dielectric layer. By processing the hollow portion, the third through-hole portion is formed. Then, the first and second external electrode layers are formed on the first and second surfaces of the dielectric layer, respectively. Accordingly, the adsorbing portion whose both ends are closed by the first and second external electrode layers is formed.

On the other hand, in the case where the adsorbing portion in which the filling body is arranged on the third through-hole portion is formed, the step of forming the adsorbing portion includes forming the third through-hole portion in the dielectric layer. A conductor is filled in the third through-hole portion, and both ends of the conductor are etched. Then, the first and second external electrode layers are formed on the first and second surfaces of the dielectric layer, respectively. Accordingly, the adsorbing portion whose both ends are closed by the first and second external electrode layers, which includes the filling body, is formed.

Hereinafter, embodiments according to the present disclosure will be described with reference to the drawings.

First Embodiment

Figure 1:
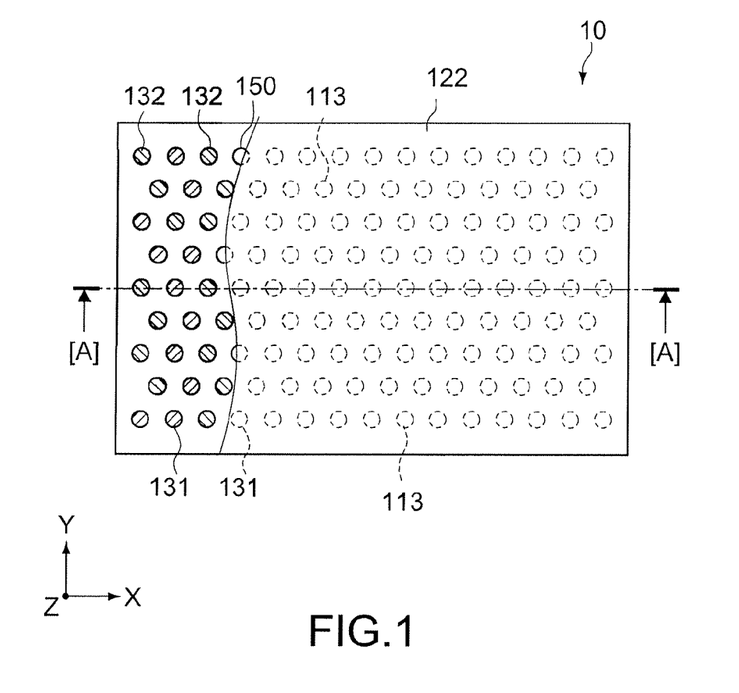
FIG. 1 is a partially cutaway plan view showing a schematic configuration of a capacitor according to a first embodiment of the present disclosure.
Figure 2:
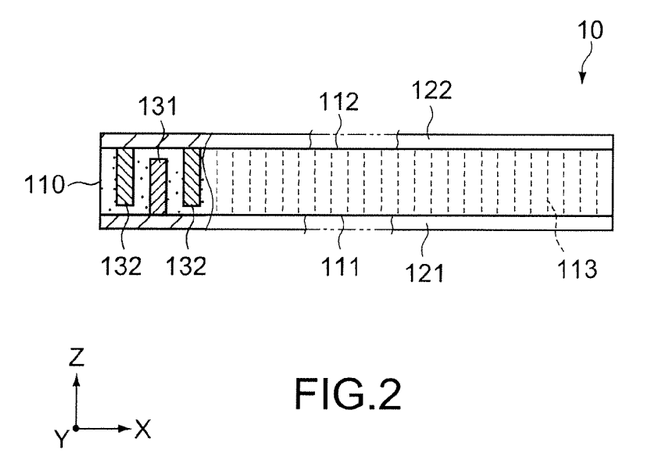
FIG. 2 is a partially cutaway plan view of the capacitor.
Figure 3:
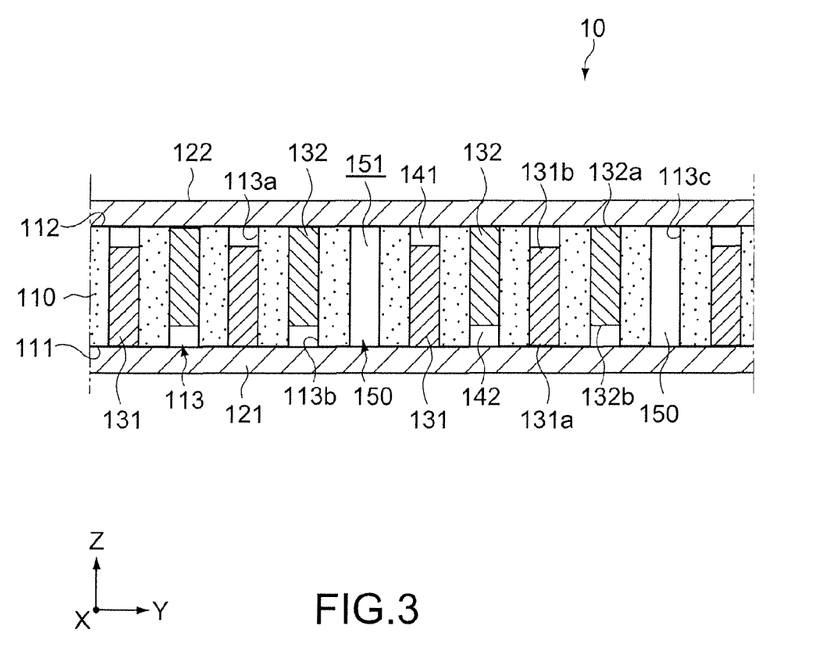
FIG. 3 is a cross-sectional view taken along the line [A]-[A] of FIG. 1.

FIG. 1 and FIG. 2 are each an outside view schematically showing a configuration of a capacitor according to a first embodiment of the present disclosure. FIG. 1 is a plan view, and FIG. 2 is a side view. Moreover, FIG. 3 is a main portion cross-sectional view taken along the line [A]-[A] of FIG. 1. In the figures, X-, Y-, and Z-axis directions represent triaxial directions perpendicular to one another.

[Entire Configuration]

A capacitor 10 according to this embodiment includes a dielectric layer 110, a first external electrode layer 121, a second external electrode layer 122, a plurality of first internal electrode portions 131, and a plurality of second internal electrode portions 132.

The first and second external electrode layers 121 and 122 are arranged so as to face each other with the dielectric layer 110 disposed therebetween. The first external electrode layer 121 is connected to, for example, a cathode, and the second external electrode layer 122 is connected to, for example, an anode. The first and second internal electrode portions 131 and 132 are provided in the dielectric layer 110, and are formed so as to have a substantially columnar shape extending in the thickness direction of the dielectric layer 110 (Z-axis direction). The first internal electrode portion 131 is connected to the first external electrode layer 121, and is insulated from the second external electrode layer 122. On the other hand, the second internal electrode portion 132 is connected to the second external electrode layer 122, and is insulated from the first external electrode layer 121.

In the above-mentioned configuration, since the plurality of internal electrode portions 131 and 132 are provided in the dielectric layer 110, the facing area between the first external electrode layer 121 and the second external electrode layer 122 is increased. Accordingly, it is possible to increase the capacity of the capacitor 10. In particular, because the internal electrode portions 131 and 132 have a microstructure, it is possible not only to increase the capacity but also to realize the size reduction of the element.

Hereinafter, the configuration of respective units in the capacitor 10 according to this embodiment will be described.

[Dielectric Layer]

The dielectric layer 110 is formed of a rectangular dielectric material having a predetermined thickness, which includes a first surface 111 (lower surface or rear surface in FIG. 3) and a second surface 112 (upper surface or front surface in FIG. 3) facing the first surface 111. In this embodiment, the dielectric layer 110 is formed of a valve metal oxide. Examples of the valve metal include Al, Ta, Nb, Ti, Zr, Hf, Zn, W, and Sb. In this embodiment, an Al oxide is used. The thickness is not particularly limited, and is, for example, several 100 nm to several 100 μm.

In the dielectric layer 110, a plurality of through-holes 113 are formed over the entire area of the surface of the dielectric layer 110. The plurality of through-holes 113 penetrate the dielectric layer 110 in the thickness direction of the dielectric layer 110, and communicate between the first surface 111 and the second surface 112. The plurality of through-holes 113 are regularly or irregularly formed in the first and second surfaces. In the example of FIG. 1, each of the plurality of through-holes 113 is formed in a predetermined arrangement. For example, the plurality of through-holes 113 are formed in a regular hexagonal arrangement in which the center of each through-hole 113 is located at the vertexes of regular hexagons. The shape and pore diameter of each through-hole 113 are not particularly limited. In this embodiment, each through-hole 113 is formed so as to have a substantially circular shape with an inner diameter of several 10 to several 100 nm. The distance between the adjacent through-holes 113 is also not particularly limited, and is, for example, several 10 to several 100 nm.

[External Electrode Layer]

The first external electrode layer 121 is arranged so as to cover the first surface 111 of the dielectric layer 110, and is in close contact with the first surface 111. The second external electrode layer 122 is arranged so as to cover the second surface 112 of the dielectric layer 110, and is in close contact with the second surface 112.

The first and second external electrode layers 121 and 122 are formed of a conductor material including a pure metal such as Cu, Ni, Cr, Ag, Pd, Fe, Sn, Pb, Pt, Ir, Rh, Ru, Al, and Ti, or an alloy thereof. The thickness of the first and second external electrode layers 121 and 122 is, for example, several 10 nm to several μm. The first and second external electrode layers 121 and 122 may be a laminated body of two or more conductor materials, and may include, for example, a Ti layer and a Cu layer laminated thereon.

[Internal Electrode Portion]

The first internal electrode portions 131 are arranged on a plurality of first through-hole portions 113a being a part of the plurality of through-holes 113, and are in close contact with the inner surfaces of the first through-hole portions 113a. As shown in FIG. 3, an end 131a of the first internal electrode portion 131 reaches the first surface 111 of the dielectric layer 110, and is connected to the first external electrode layer 121. The other end 131b of the first internal electrode portion 131 does not reach the second surface 112 of the dielectric layer 110, and is insulated from the second external electrode layer 122. Between the other end 131b of the first internal electrode portion 131 and the second external electrode layer 122, an insulating layer 141 including a space or formed of an insulating material is formed.

The second internal electrode portions 132 are arranged on a plurality of second through-hole portions 113b being another part of the plurality of through-holes 113, and are in close contact with the inner surfaces of the second through-hole portions 113b. As shown in FIG. 3, an end 132a of the second internal electrode 132 reaches the second surface 112 of the dielectric layer 110, and is connected to the second external electrode layer 122. The other end 132b of the second internal electrode portion 132 does not reach the first surface 111 of the dielectric layer 110, and is insulated from the first external electrode layer 121. Between the other end 132b of the second internal electrode portion 132 and the first external electrode layer 121, an insulating layer 142 including a space or formed of an insulating material is formed.

The first and second internal electrode portions 131 and 132 are formed of a metal material. In this embodiment, a general metal (e.g., Cu, Ni, Co, Cr, Ag, Au, Pd, Fe, Sn, Pb, and Pt), which can be plated, or an alloy thereof is used.

The arrangement position of each of the first internal electrode portion 131 and the second internal electrode portion 132 is not particularly limited. In this embodiment, as shown in FIG. 1, almost the same number of the first internal electrode portion 131 and the second internal electrode portion 132 are randomly arranged. The proportion of the first internal electrode portion 131 and the second internal electrode portion 132 is not particularly limited. However, as the number of the first internal electrode portion 131 is close to that of the second internal electrode portion 132, it is possible to more efficiently increase the capacity of an element.

[Adsorbing Portion]

The capacitor 10 according to this embodiment further includes an adsorbing portion 150. The adsorbing portion 150 is provided on a third through-hole portion 113c being the remaining portion of the plurality of through-holes 113, and includes a negative pressure space 151 adsorbing the first external electrode layer 121 and the second external electrode layer 122.

In this embodiment, the adsorbing portion 150 includes the negative pressure space 151, which is maintained in a negative pressure state and has a columnar shape. The negative pressure space 151 is partitioned by the inner wall surface of the third through-hole portion 113c and the inner surfaces of the first and second external electrode layers 121 and 122, which close both ends thereof. Since the negative pressure space 151 is maintained in a negative pressure state, the negative pressure space 151 adsorbs the first and second external electrode layers 121 and 122 by the difference in pressure between the inside and outside. Accordingly, the first and second external electrode layers 121 and 122 are brought into close contact with the first and second surfaces 111 and 112 of the dielectric layer 110, respectively, and the bonding power between the first and second external electrode layers 121 and 122 and the dielectric layer 110 is increased.

The adsorbing portion 150 is formed at a plurality of positions in the surface of the capacitor 10. The position where the adsorbing portion 150 is formed is not particularly limited, and is regularly or irregularly formed in the surface of the dielectric layer 110. By forming the plurality of adsorbing portions 150, the adhesive effect of the first and second external electrode layers 121 and 122 on the dielectric layer 110 is increased. The number of adsorbing portions 150 to be formed is not particularly limited. The lower limit is set depending on, for example, the adhesive strength of the first and second external electrode layers 121 and 122 on the dielectric layer 110, and the upper limit is set depending on, for example, the full capacity demanded for the capacitor 10.

Moreover, the adsorbing portion 150 may be selectively formed on the periphery of the dielectric layer 110, or may be dispersively formed over the entire area of the surface of the dielectric layer 110. The inventors of the present disclosure have produced 1000 samples (sample 1) of a capacitor in which the adsorbing portion 150 is formed on the periphery of the dielectric layer 110, 1000 samples (sample 2) of a capacitor in which the adsorbing portion 150 is formed over the entire area of the surface of the dielectric layer 110, and 1000 samples (sample 3) of a capacitor in which the adsorbing portion 150 is not formed, and have evaluated whether there is removal of the external electrode layers 121 and 122 by using an optical microscope with a magnification of 80×. As a result, the proportion of samples in which the removal has been detected is 0% in the case of the sample 1, 0.3% in the case of the sample 2, and 2.7% in the case of the sample 3.

By the capacitor 10 according to this embodiment, the adhesive strength of the first and second external electrode layers 121 and 122 on the dielectric layer 110 is increased. Therefore, it is possible to prevent the interface between the dielectric layer and the first and second external electrode layers 121 and 122 from being removed due to an effect of stress or the like. Accordingly, it is possible to increase the durability of the capacitor 10. Moreover, the degree of freedom in selection of a material of the dielectric layer 110 and the first and second external electrode layers 121 and 122 is increased, and materials having low mutual adhesive strength can be combined.

[Manufacturing Method]

Next, a method of manufacturing the capacitor 10 according to this embodiment will be described. FIGS. 4 to 6 are each a process cross-sectional view of a main portion for explaining the method of manufacturing the capacitor 10.

Figure 4A:
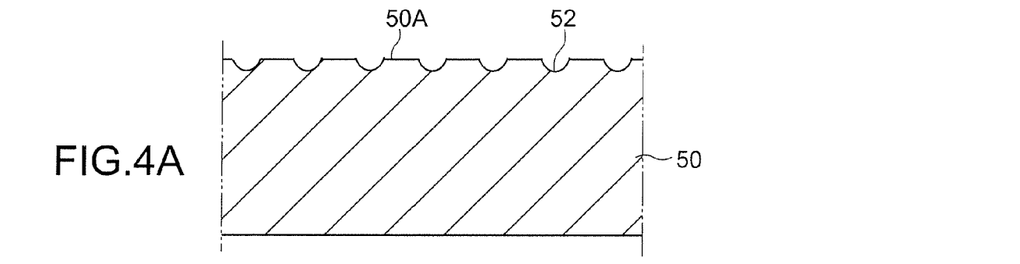
FIGS. 4A-4D are each a process cross-sectional view for explaining a method of manufacturing the capacitor shown in FIG. 3.
Figure 4B:
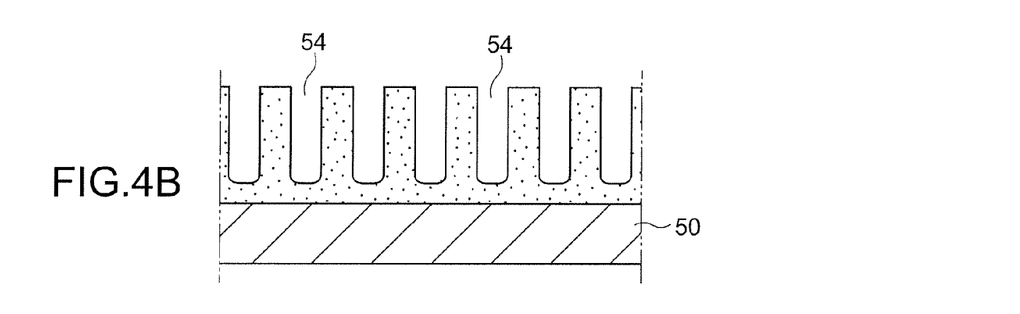

First, as shown in FIG. 4A, a base material 50 formed of valve metal is prepared, and a pit 52, which is a starting point of anodic oxidation, is formed on a surface 50A of the base material 50 in a hexagonal close-packed arrangement. Next, by applying voltage to the pit 52, the pit 52 is subject to anodic oxidation treatment. Thus, as shown in FIG. 4B, a plurality of first holes 54 having a bottom and a desired depth (or length) are formed in the thickness direction of the base material 50.

Figure 4C:
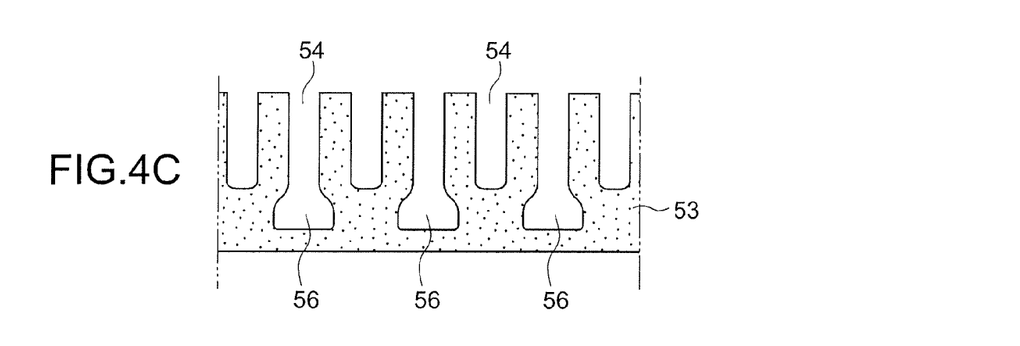

Subsequently, applying voltage larger than that when the first holes 54 are formed, the pit 52 is subjected to anodic oxidation treatment. Thus, as shown in FIG. 4C, a plurality of second holes 56 having a bottom are formed. After that, a bare metal portion of the base material 50 is removed by a wet etching method, thereby obtaining an oxide base material 53 having the first hole 54 and the second hole 56.

Because a pitch (distance between holes) between holes generated by the anodic oxidation is in proportion to the magnitude of voltage, the pitch between the second holes 56 subjected to large voltage is larger than that between the first holes 54, and the second hole 56 is randomly connected to a part of the first hole 54.

The conditions for the anodic oxidation treatment can be appropriately set. For example, in the anodic oxidation in the first stage shown in FIG. 4B, the applied voltage is set to several V to several 100 V, and the treatment time period is set to several minutes to several days. In the anodic oxidation in the second stage shown in FIG. 4C, the voltage value of the applied voltage is set to be several times as large as that in the first stage, and the treatment time period is set to several minutes to several ten minutes. For example, if the applied voltage in the first stage is 40 V, the first hole 54 having a diameter of approximately 100 nm can be obtained. If the applied voltage in the second stage is 80 V, the second hole 56 having a diameter of approximately 200 nm can be obtained. If the voltage value in the second stage is within the above-mentioned range, the number of first holes 54 connected to the second hole 56 is almost equivalent to the number of first holes 54 not connected to the second hole 56. Accordingly, the number of first internal electrode portions 131 formed in the first hole 54 that is connected to the second hole 56 is equivalent to the number of second electrode portions 132 formed in the first hole 54 that is not connected to the second hole 56. Therefore, it is possible to efficiently extract the capacity. Moreover, if the treatment time period in the second stage is within the above-mentioned range, it is possible to reduce the thickness of the oxide base material formed in the second stage while sufficiently completing the pitch conversion of the hole. Because the oxide base material formed in the second stage is removed in the subsequent step, the thickness of the oxide base material is desirably thin as much as possible.

Figure 4D:
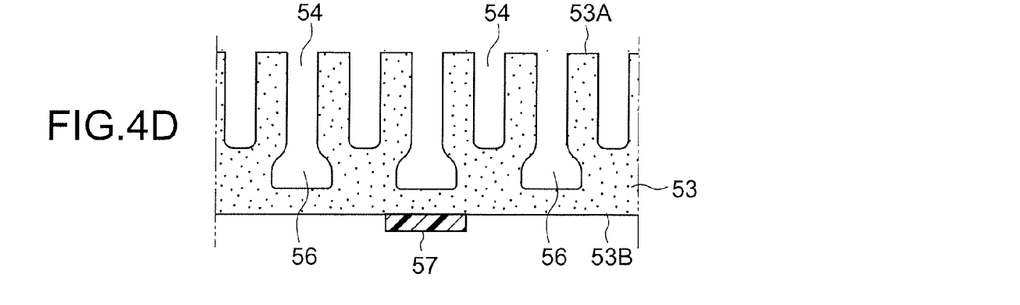

Next, as shown in FIG. 4D, a resist pattern 57 is formed on a rear surface 53B of the oxide base material 53. The resist pattern 57 is formed for forming the adsorbing portion 150, and is formed on an arbitrary position of the oxide base material 53 depending on the position of the formed adsorbing portion 150.

For forming the resist pattern 57, a screen printing method, a spray coating method, or the like can be used. For example, in the case where the adsorbing portion 150 is selectively formed on the periphery of the capacitor element or the like, the resist pattern 57 is formed by the screen printing method.

In the case where the adsorbing portion 150 is randomly formed in the surface of the capacitor element, the resist pattern 57 is formed by the spray coating method.

Figure 5A:
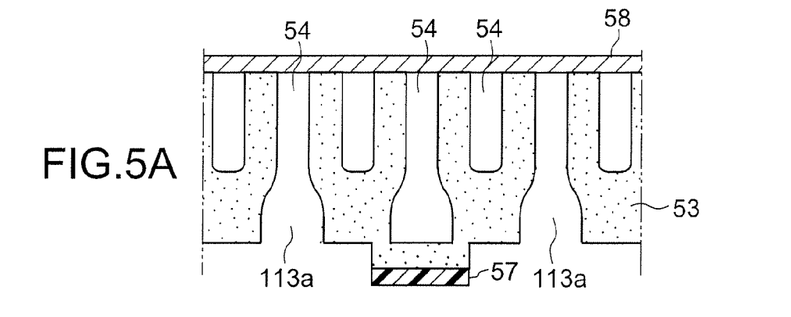
FIGS. 5A-5D are each a process cross-sectional view for explaining the method of manufacturing the capacitor shown in FIG. 3.

Next, the rear surface 53B of the oxide base material 53 is subject to reactive ion etching (RIE). Thus, as shown in FIG. 5A, the bottom of the second hole 56 is opened. Accordingly, a first through-hole portion 113a is formed. At this time, the resist pattern 57 functions as a resist mask, and maintains the non-through state of the second hole 56 located right above the resist pattern 57. Then, a conductor layer 58 is formed on a front surface 53A of the oxide base material 53. The conductor layer 58 is formed by a sputtering method, a vacuum deposition method, or the like.

Figure 5B:
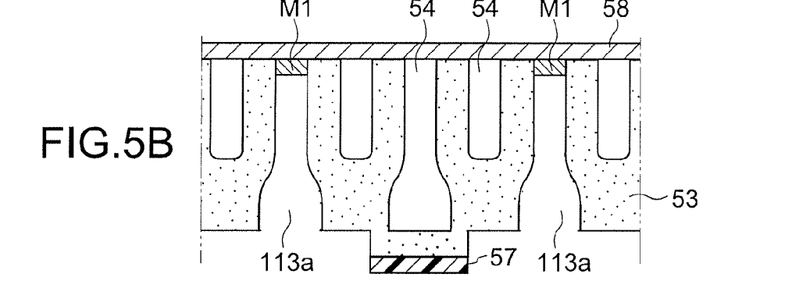

Next, as shown in FIG. 5B, by an electrolytic plating method in which the conductor layer 58 is used as a seed layer, a first plating conductor M1 having a predetermined length is formed in the first hole 54 connected to the second hole 56 whose bottom is opened (first through-hole portion 113a). At this time, because a plating solution does not enter the first hole 54 located right above the resist pattern 57, the first plating conductor M1 is not formed.

Figure 5C:
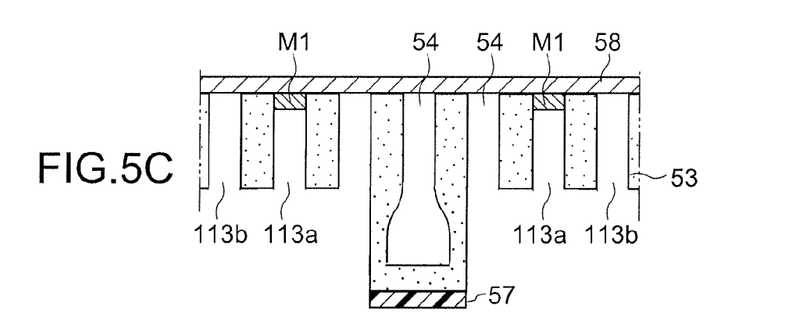
Figure 5D:
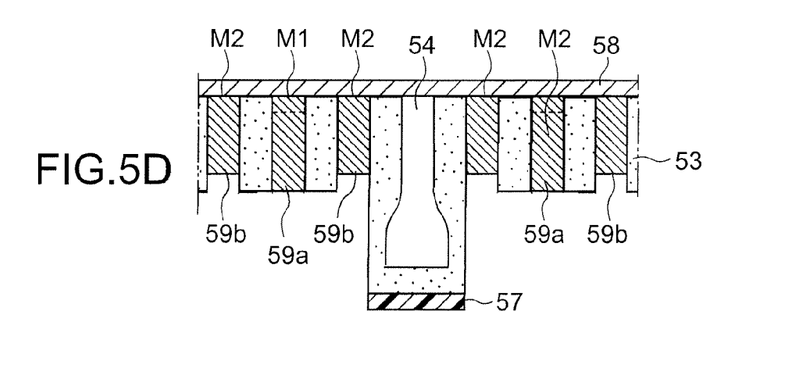

Next, the rear surface 53B of the oxide base material 53 is subject to RIE. Thus, as shown in FIG. 5C, bottoms of the first holes 54 other than that in the area where the resist pattern 57 is formed are opened. Accordingly, the second through-hole portion 113b is formed. Then, as shown in FIG. 5D, a second plating conductor M2 is formed in the first and second through-hole portions 113a and 113b by the electrolytic plating method in which the conductor layer 58 is used as a seed layer.

The length of the second plating conductor M2 is set such that the first through-hole portion 113a in which the first plating conductor M1 is formed can be filled with the plating conductor M2. Accordingly, the second plating conductor M2 is formed in the second through-hole portion 113b so as to have a length that does not exceed the depth of the second through-hole portion 113b. Thus, a cavity portion is formed. The cavity portion may be hollow, or an insulating material may be filled in the cavity portion. Examples of the insulating material include valve metal oxide as in the case of the oxide base material 53, an electrodepositable resin material (e.g., polyimide, epoxy, acrylic), and $SiO_2$. The thickness (height) of the cavity portion is not particularly limited, and can be set depending on the element capacitance, predetermined dielectric strength voltage between the internal and external electrodes, or the like. For example, the thickness of the cavity portion is several 10 nm to several 10 μm.

Here, a laminated conductor of the first and second plating conductors M1 and M2 constitutes a first electrode column 59a for forming the first internal electrode portion 131 later, and a single-layer conductor including only the second plating conductor M2 constitutes a second electrode column 59b for forming the second internal electrode portion 132 later. It should be noted that the first and second plating conductors M1 and M2 are typically formed of the same kind of metal material, but may be formed of different metal materials.

Figure 6A:
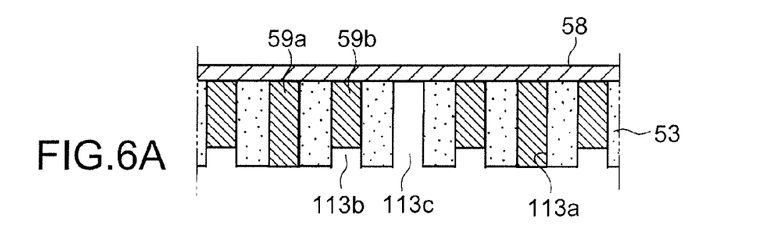
FIGS. 6A-6D are each a process cross-sectional view for explaining the method of manufacturing the capacitor shown in FIG. 3.

Next, as shown in FIG. 6A, the rear surface of the oxide base material 53 is polished to be planarized. As the planarization treatment, for example, a chemical mechanical polishing (CMP) method is used. Accordingly, the bottom of the first hole 54 located right above the resist pattern 57 is opened, and the third hollow through-hole portion 113c in which the plating conductors M1 and M2 are not formed is formed. The planarized oxide base material 53 constitutes the dielectric layer 110 of the capacitor 10.

Figure 6B:
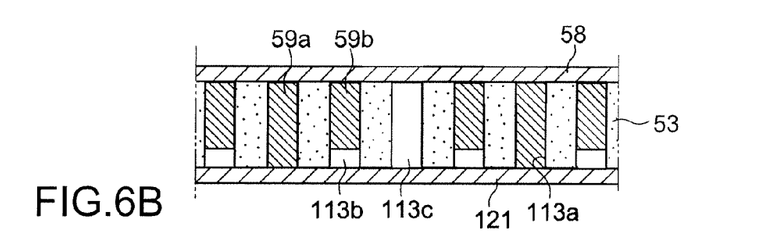

Next, as shown in FIG. 6B, the first external electrode layer 121 is formed on the rear surface of the oxide base material 53. The first external electrode layer 121 is formed by, for example, a method in which deposition is performed in a negative pressure atmosphere, such as a sputtering method and a deposition method. By using such a method, the first external electrode layer 121 having high adhesiveness to the oxide base material 53 can be deposited. In particular, because a large amount of energy is consumed in the sputtering method, it is possible to achieve higher adhesiveness. The first external electrode layer 121 is formed so as to have a sufficient thickness (e.g., more than twice the pore size of the through-hole 113) to hermetically seal the through-hole 113. The negative pressure atmosphere when the first external electrode layer 121 is formed may be, for example, not more than 10 Pa (pascal).

Figure 6C:
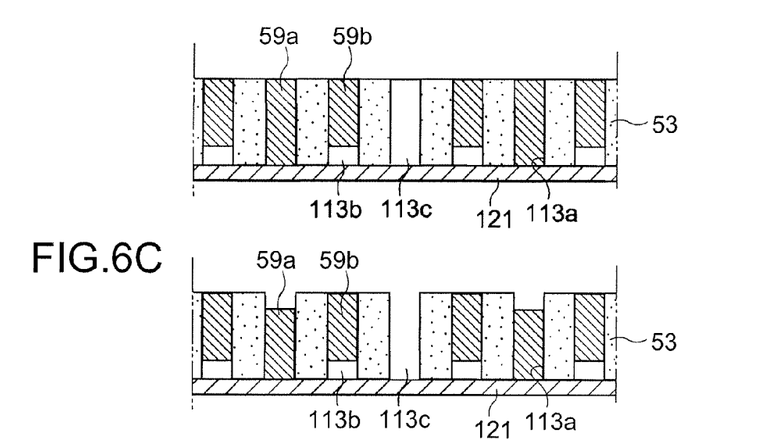

After that, as shown in FIG. 6C, the conductor layer 58 on the surface of the oxide base material 53 is removed. The method of removing the conductor layer 58 is not particularly limited, and a wet etching method, a dry etching method, an ion milling method, a CMP method or the like can be used.

Figure 6D:
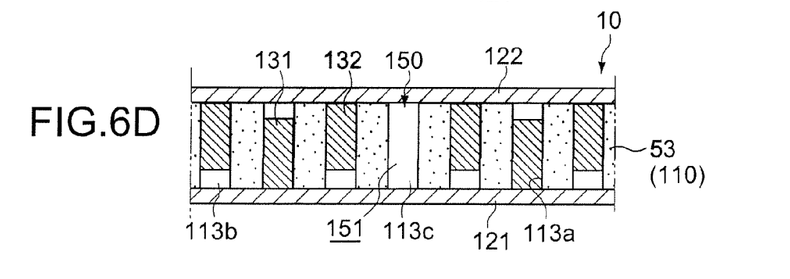

Next, as shown in FIG. 6D, the first electrode column 59a is removed by only a predetermined depth by an electrolytic etching method in which the first external electrode layer 121 is used as a seed layer. Accordingly, a cavity portion having a predetermined depth is formed between the tip of the first electrode column 59a and the surface of the oxide base material 53. The cavity portion may be hollow as it is, or may be filled with an insulating material. Examples of the insulating material include valve metal oxide as in the case of the oxide base material 53, an electrodepositable resin material (e.g., polyimide, epoxy, acrylic), and $SiO_2$. The thickness (height) of the cavity portion is not particularly limited, and can be set depending on the element capacitance, predetermined dielectric strength voltage between the internal and external electrodes, or the like. For example, the thickness of the cavity portion is several 10 nm to several 10 μm.

Finally, as shown in FIG. 6E, the second external electrode layer 122 is formed on the surface of the oxide base material 53. The second external electrode layer 122 is formed by, for example, a method in which deposition is performed in a negative pressure atmosphere, such as a sputtering method and a deposition method. By using such a method, the second external electrode layer 122 having high adhesiveness to the oxide base material 53 can be deposited. In particular, because a large amount of energy is consumed in the sputtering method, it is possible to achieve higher adhesiveness. The second external electrode layer 122 is formed so as to have a sufficient thickness (e.g., more than twice the pore size of the through-hole 113) to hermetically seal the through-hole 113. The negative pressure atmosphere when the second external electrode layer 122 is formed may be, for example, not more than 10 Pa (pascal).

Accordingly, the adsorbing portion 150 having a negative pressure space in which the third through-hole portion 113c is sealed with the first and second external electrode layers 121 and 122 is formed. Moreover, the first internal electrode portion 131, which is connected to the first external electrode layer 121 and is insulated from the second external electrode layer 122, and the second electrode portion 132, which is connected to the second external electrode layer 122 and is insulated from the first external electrode layer 121, are formed.

In this way, the capacitor 10 according to this embodiment is produced. According to this embodiment, the external electrode layers 121 and 122 are deposited in a negative pressure atmosphere. Therefore, it is possible to easily produce the adsorbing portion 150 having the negative pressure space 151. Accordingly, by using the vacuum adsorption operation of the negative pressure space 151, it is possible to improve the adhesiveness of the first and second external electrode layers 121 and 122 on the dielectric layer 110 and to obtain the capacitor 10 having excellent reliability.

Moreover, also by forming at least any one of a cavity formed between the first internal electrode portion 131 and the second external electrode layer 122 and a cavity formed between the second internal electrode portion 132 and the first external electrode layer 121 to be hollow, it is possible to obtain the negative pressure adsorption operation on the external electrode layers 121 and 122 as in the case of the adsorbing portion 150. When the embodiment is partially compared to the first embodiment, the first embodiment is superior to the embodiment in that the adsorbing power and adhesive force to the external electrode layers 121 and 122 are high because two adsorbing portions are formed in one through-hole and there is the negative pressure space 151 having a large area.

Second Embodiment

Figure 7:
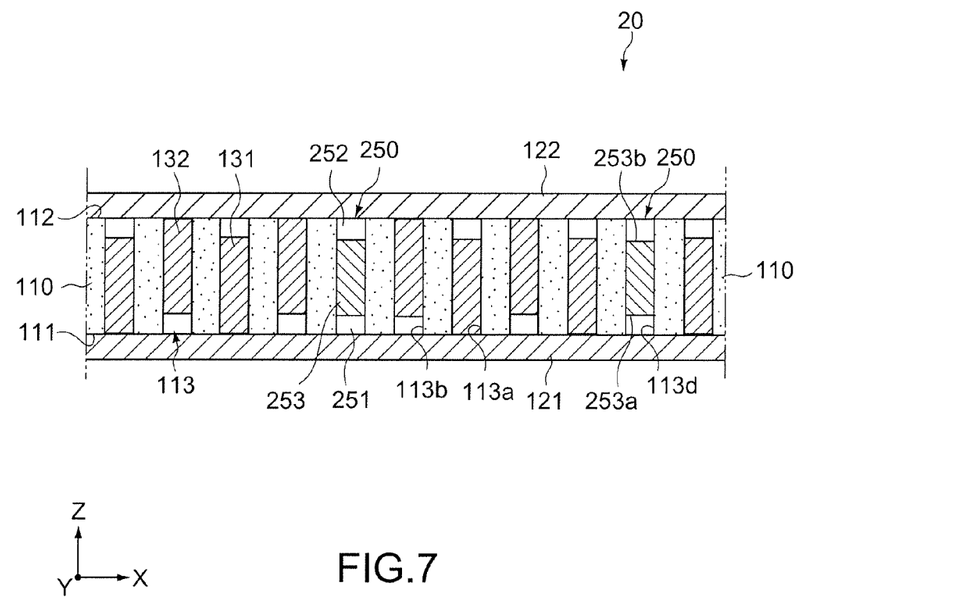
FIG. 7 is a cross-sectional side view showing a schematic configuration of a capacitor according to a second embodiment of the present disclosure.

FIG. 7 is a schematic cross-sectional view showing a configuration of a capacitor according to a second embodiment of the present disclosure. Hereinafter, the configuration different from that in the first embodiment will be mainly described, the same configuration as that according to the above-mentioned embodiment will be denoted by the same reference symbols and a description thereof will be omitted or simplified.

A capacitor 20 according to this embodiment includes the dielectric layer 110, the first external electrode layer 121, the second external electrode layer 122, the first internal electrode portion 131, the second internal electrode portion 132, and an adsorbing portion 250. Because the dielectric layer 110, the first and second external electrode layers 121 and 122, the first and second internal electrode portions 131 and 132 have the same configurations as those of the first embodiment, the description thereof will be omitted.

[Adsorbing Portion]

The adsorbing portions 250 are provided on a plurality of through-hole portions 113d (third through-hole portions) formed in the dielectric layer 110, and include a first cavity portion 251 and a second cavity portion 252, which adsorbs the first external electrode layer 121 and the second external electrode layer 122, respectively. Each of the first and second cavity portions 251 and 252 corresponds to a negative pressure space maintained in a negative pressure state. Specifically, the first external electrode layer 121 is brought into close contact with the first surface 111 of the dielectric layer 110 by the vacuum adsorption operation of the first cavity portion 251, and the second external electrode layer 122 is brought into close contact with the second surface 112 of the dielectric layer 110 by the vacuum adsorption operation of the second cavity portion 252.

The adsorbing portion 250 includes a filling body 253 arranged in the through-hole portion 113d. The filling body 253 includes a first end portion 253a facing the first external electrode layer 121 via the first cavity portion 251, and a second end portion 253b facing the second external electrode layer 122 via the second cavity portion 252. The adsorbing portion 250 is formed at a plurality of positions in the surface of the capacitor 20. The position where the adsorbing portion 250 is formed is not particularly limited, and the adsorbing portion 250 may be regularly or irregularly formed. The number of adsorbing portions 250 to be formed is also not particularly limited.

Moreover, the adsorbing portion 250 may be selectively formed on the periphery of the dielectric layer 110, or may be formed over the entire area of the surface of the dielectric layer 110. According to the experiments performed by the present inventors, 1000 samples (sample 1) of a capacitor in which the adsorbing portion 250 is formed on the periphery of the dielectric layer 110, 1000 samples (sample 2) of a capacitor in which the adsorbing portion 250 is formed over the entire area of the surface of the dielectric layer 110, and 1000 samples (sample 3) of a capacitor in which the adsorbing portion 250 is not formed have been produced, and whether there is removal of the external electrode layers 121 and 122 has been evaluated by using an optical microscope with a magnification of 80x. As a result, the proportion of samples in which the removal has been detected is 0.2% in the case of the sample 1, 0.8% in the case of the sample 2, and 2.7% in the case of the sample 3.

The filling body 253 has an advantage that the strength of each of the through-hole portions 113d is increased by being provided on each of the through-hole portions 113d. Moreover, the filling body 253 has a function that separates the first cavity portion 251 from the second cavity portion 252 with respect to each of the through-hole portions 113d. The first cavity portion 251 may have the same thickness (depth) as the second cavity portion 252, or may have a different thickness from the second cavity portion 252.

The constituent material of the filling body 253 is not particularly limited, and may be an insulator or a conductor such as metal. If the filling body 253 includes a conductor, the element capacitance is increased as compared with the case where the filling body 253 includes an insulator, or where the filling body 253 is not provided (the entire adsorbing portion includes a space).

Figure 8A:
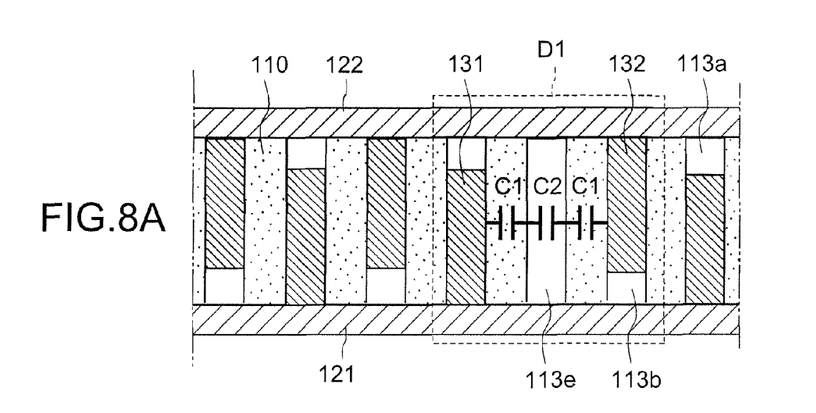
Figure 8B:
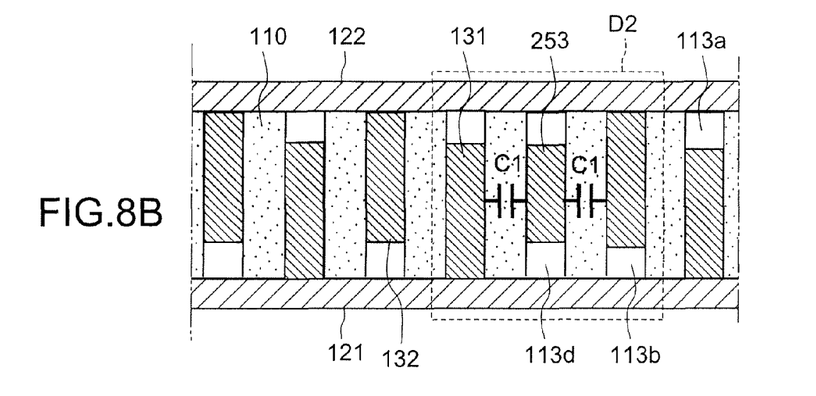

For example, FIG. 8 show the difference between the case where a hole portion is formed and the case where a hole portion is not formed. FIG. 8A is a schematic cross-sectional view of a main portion of a capacitor including a through-hole portion 113e that is not filled with a filling body, and FIG. 8B is a schematic cross-sectional view of a main portion of a capacitor including the through-hole portion 113d that is filled with the filling body 253.

As shown in FIG. 8A, in the case where there is a hole (through-hole portion 113e) between the positive and negative internal electrode portions 131 and 132, the capacitance of a capacitance unit represented by a broken line D1 is the series combined capacitance of two capacitances C1 formed by a dielectric wall and one capacitance C2 formed by a hole. On the other hand, as shown in FIG. 8B by a broken line D2, the capacitance in the case where the through-hole portion 113d is filled with the filling body 253d including a conductor is the series combined capacitance of the two capacitances C1. Therefore, in the case where the filling body 253 is arranged, a larger capacitance can be obtained. Specifically, as the C2 is smaller, larger series combined capacitance can be obtained. The C2 is relatively large in the case where there is nothing in a hole, and the C2 is relatively small in the case where a hole is filled with the filling body 253.

By the capacitor 20 according to this embodiment, the adhesive strength of the first and second external electrode layers 121 and 122 on the dielectric layer 110 is increased. Therefore, it is possible to prevent the interface between the dielectric layer and the first and second external electrode layers 121 and 122 from being removed due to an effect of stress or the like. Accordingly, it is possible to increase the durability of the capacitor 20. Moreover, the degree of freedom in selection of a material of the dielectric layer 110 and the first and second external electrode layers 121 and 122 is increased, and materials having low mutual adhesive strength can be combined.

Moreover, the filling body 253 constituting the adsorbing portion 250 is formed of a conductor material, thereby preventing the element capacitance from being decreased due to the existence of the adsorbing portion 250. Accordingly, it is possible to provide the capacitor 20 having excellent durability and high capacity.

[Manufacturing Method]

Next, a method of manufacturing the capacitor 20 according to this embodiment will be described. FIGS. 9 to 11 are each a process cross-sectional view of a main portion for explaining a method of manufacturing the capacitor 20. Here, because processes up to the process shown in FIG. 9 are the same as those in the first embodiment (see FIGS. 4A to D, FIGS. 5A to D, and FIG. 6A), the description thereof will be omitted.

Figure 9A:
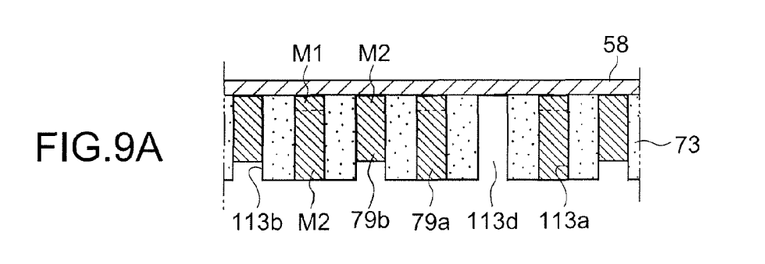
FIGS. 9A-9E are each a process cross-sectional view for explaining a method of manufacturing the capacitor shown in FIG. 7.
Figure 9B:
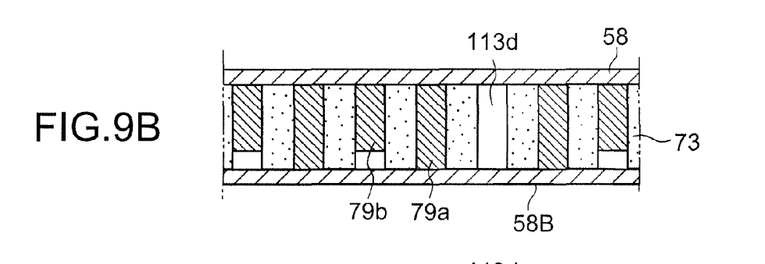
Figure 9C:
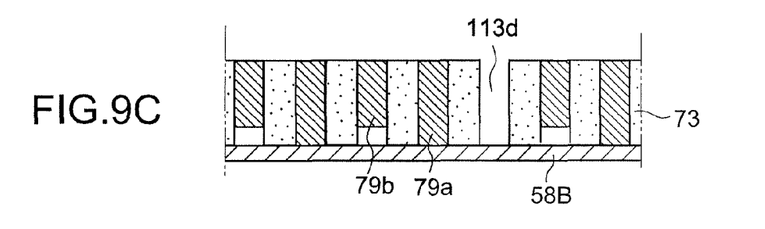

As shown in FIG. 9B, a second conductor layer 58B is formed on the rear surface of the oxide base material 73. The oxide base material 73 corresponds to the oxide base material 53 in the first embodiment, and includes the plurality of through-hole portions 113a, 113b, and 113d. The second conductor layer 58B is formed by, for example, a sputtering method, a vacuum deposition method, or the like. After that, as shown in FIG. 9C, the first conductor layer 58 is removed from the surface of the oxide base material 73. The method of removing the first conductor layer 58 is not particularly limited, and a wet etching method, a dry etching method, an ion milling method, a CMP method, or the like can be used.

Figure 9D:
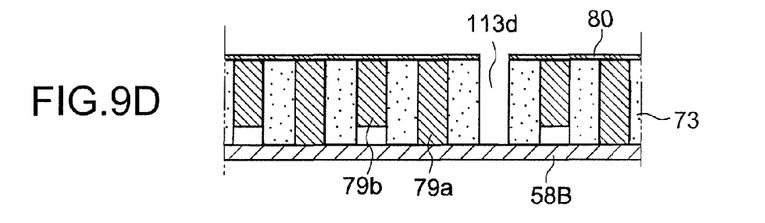

Next, as shown in FIG. 9D, an insulating film 80 is formed on the surface of the oxide base material 73. The insulating film 80 covers the surface of the oxide base material 73 and the surfaces of second electrode columns 79a and 79b while opening the through-hole portion 113d.

The first electrode column 79a includes a laminated conductor of the first and second plating conductors M1 and M2, and constitutes the first internal electrode portion 131 later. The second electrode column 79b includes a single-layer conductor of the second plating conductor M2, and constitutes the second internal electrode portion 132 later. The kind of the insulating film 80 is not particularly limited, and an inorganic insulating film such as a silicon oxide film or an organic insulating film such as synthetic resin can be applied to the insulating film 80. The deposition method is not particularly limited, and a sputtering method, a CVD method, a coating method can be used. The thickness of the insulating film 80 is not particularly limited, and can be arbitrarily set so as not to block the through-hole portion 113d.

Figure 9E:
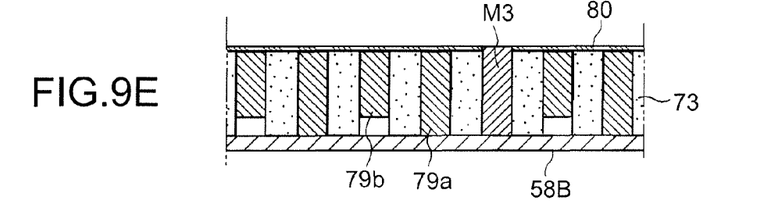

Next, as shown in FIG. 9E, the through-hole portion 113d is filled with a third plating conductor M3 by an electrolytic plating method in which the second conductor layer 58B is used as a seed layer. The third plating conductor M3 is formed so as to have a height such that the tip of the plating conductor M3 reaches the surface of the insulating film 80. Although the third plating conductor M3 is formed of the same kind of material as that of the first and second plating conductors M1 and M2, the third plating conductor M3 may be formed of a different material from the first and second plating conductors M1 and M2.

Figure 10A:
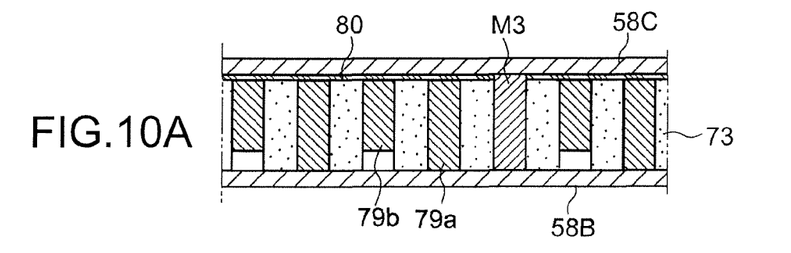
FIGS. 10A-10D are each a process cross-sectional view for explaining the method of manufacturing the capacitor shown in FIG. 7.
Figure 10B:
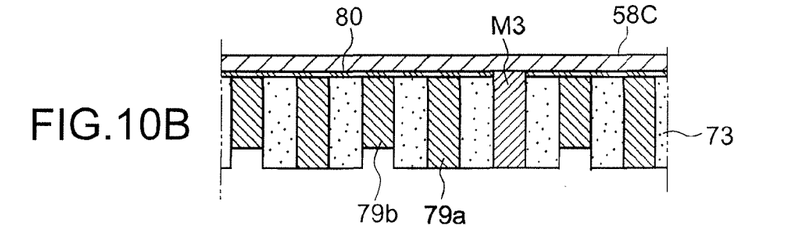

Next, as shown in FIG. 10A, a third conductor layer 58C is formed on the surface of the insulating film 80. The third conductor layer 58C is formed by a sputtering method, a vacuum deposition method, or the like. The third conductor layer 58C is connected to the tip of the third plating conductor M3 that is exposed from the surface of the insulating film 80. After that, as shown in FIG. 10B, the second conductor layer 58B is removed from the rear surface of the oxide base material 73. The method of removing the second conductor layer 58B is not particularly limited, and a wet etching method a dry etching method, an ion milling method, a CMP method, or the like can be used.

Figure 10C:
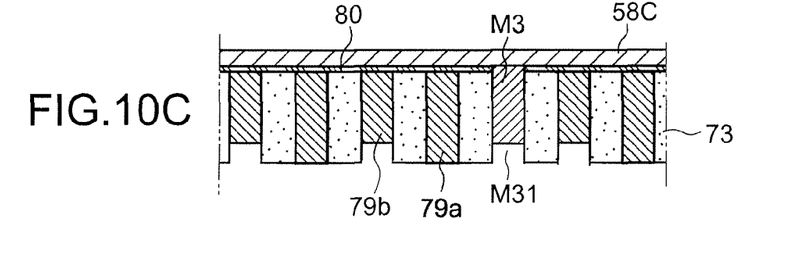

Next, as shown in FIG. 10C, the third plating conductor M3 that is exposed from the rear surface of the oxide base material 73 is removed by a predetermined depth by an electrolytic etching method in which the third conductor layer 58C is used as a seed layer. Accordingly, a lower end portion M31 of the plating conductor M3 is formed at the position lowered from the rear surface of the oxide base material 73 by the predetermined depth in the oxide base material 73. The lower end portion M31 constitutes the first end portion 253a of the filling body 253 later.

Figure 10D:
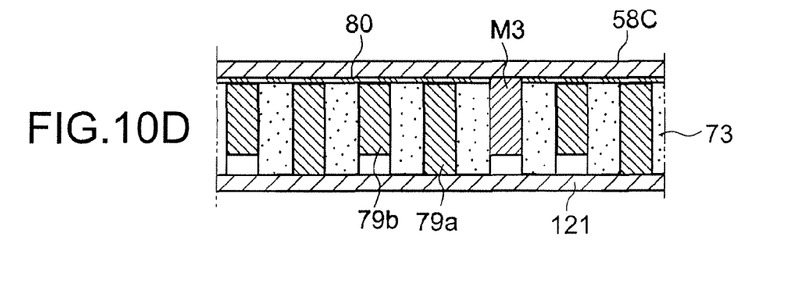

Next, as shown in FIG. 10D, the first external electrode layer 121 is formed on the rear surface of the oxide base material 73. The first external electrode layer 121 is formed by, for example, a method in which deposition is performed in a negative pressure atmosphere, such as a sputtering method and a deposition method. By using such a method, the first external electrode layer 121 having high adhesiveness to the oxide base material 73 can be deposited. In particular, because a large amount of energy is consumed in the sputtering method, it is possible to achieve higher adhesiveness. The first external electrode layer 121 is formed so as to have a sufficient thickness (e.g., more than twice the pore size of the through-hole 113) to hermetically seal the through-hole 113. The negative pressure atmosphere when the first external electrode layer 121 is formed may be, for example, not more than 10 Pa (pascal).

Figure 11A:
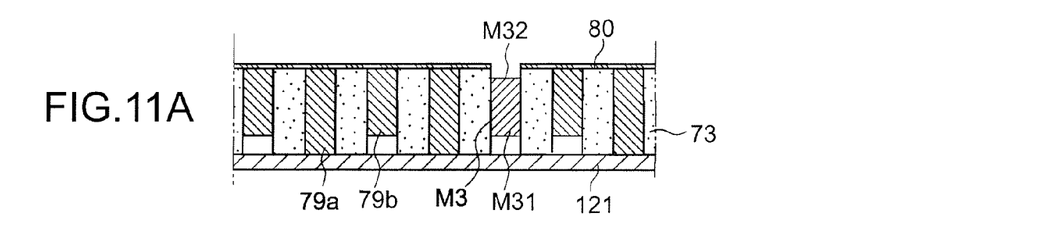
FIGS. 11A-11D are each a process cross-sectional view for explaining the method of manufacturing the capacitor shown in FIG. 7.

Next, as shown in FIG. 11A, the third conductor layer 58C is removed from the surface of the oxide base material 73. The method of removing the third conductor layer 58C is not particularly limited, and a wet etching method, a dry etching method, an ion milling method, a CMP method, or the like can be used.

In this embodiment, the third conductor layer 58C is removed by the wet etching method. Subsequently, the third plating conductor M3 exposed from the insulating film 80 is etched by a predetermined depth. Accordingly, an upper end portion M32 of the plating conductor M3 is formed at the position lowered from the surface of the oxide base material 73 by the predetermined depth in the oxide base material 73. The upper end portion M32 constitutes an end portion 253b of the filling body 253 later.

The third plating conductor M3 is formed of a material that can be dissolved in an etching solution used in the process of removing the third conductor layer 58C. Accordingly, the etching treatment of the conductor layer 58C and the plating conductor M3 can be performed in the same process, and it is possible to improve the productivity. Therefore, the third plating conductor M3 may be formed of the same material as the third conductor layer 58C.

Figure 11B:
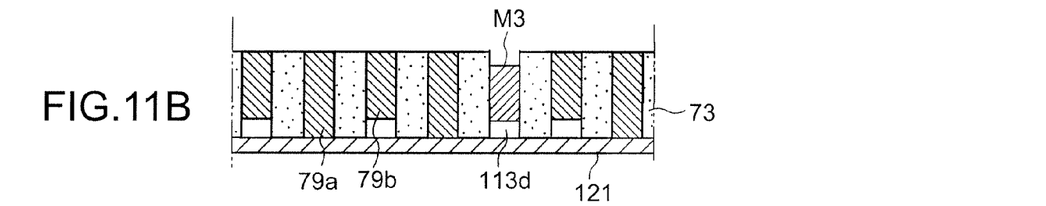

Next, as shown in FIG. 11B, the insulating film 80 on the oxide base material 73 is removed. The method of removing the insulating film 80 is not particularly limited, and a wet etching method, a dry etching method, an ion milling method, a CMP method, or the like can be used.

Figure 11C:
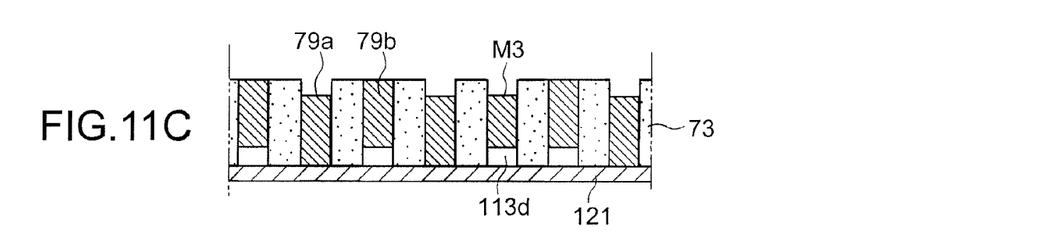

Next, as shown in FIG. 11C, the first electrode column 79a is removed by a predetermined depth by an electrolytic etching method in which the first external electrode layer 121 is used as a seed layer. Accordingly, a cavity portion having a predetermined depth is formed between the tip of the first electrode column 79a and the surface of the oxide base material 73. The cavity portion may be hollow as it is, or may be filled with an insulating material. Examples of the insulating material include valve metal oxide as in the case of the oxide base material 73, an electrodepositable resin material (e.g., polyimide, epoxy, acrylic), and $SiO_2$. The thickness (height) of the cavity portion is not particularly limited, and can be set depending on the element capacitance, predetermined dielectric strength voltage between the internal and external electrodes, or the like. For example, the thickness of the cavity portion is several 10 nm to several 10 μm.

Figure 11D:
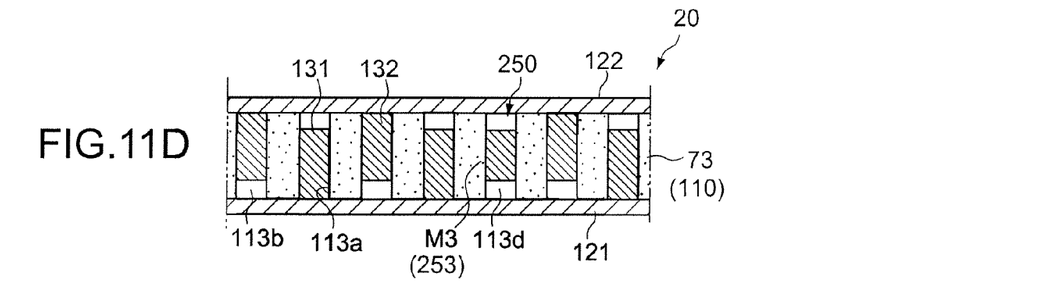

Finally, as shown in FIG. 11D, the second external electrode layer 122 is formed on the surface of the oxide base material 73. The second external electrode layer 122 is formed by, for example, a method in which deposition is performed in a negative pressure atmosphere, such as a sputtering method and a deposition method. By using such a method, the second external electrode layer 122 having high adhesiveness to the oxide base material 73 can be deposited. In particular, because a large amount of energy is consumed in the sputtering method, it is possible to achieve higher adhesiveness. The second external electrode layer 122 is formed so as to have a sufficient thickness (e.g., more than twice the pore size of the through-hole 113) to hermetically seal the through-hole 113. The negative pressure atmosphere when the second external electrode layer 122 is formed may be, for example, not more than 10 Pa (pascal).

Accordingly, the third through-hole portion 113d is sealed with the first and second external electrode layers 121 and 122. Then, the first internal electrode portion 131, which is connected to the first external electrode layer 121 and is insulated from the second external electrode layer 122, and the second electrode portion 132, which is connected to the second external electrode layer 122 and is insulated from the first external conductor layer 121, are formed. Moreover, the adsorbing portion 250 having the filling body 253 and the first and second cavity portions 251 and 252 in the through-hole portion 113d is formed.

In this way, the capacitor 20 according to this embodiment is produced. According to this embodiment, since the first and second external electrode layers 121 and 122 are deposited in a negative pressure atmosphere, it is possible to easily produce the adsorbing portion 250 having the first and second cavity portions 251 and 252. Accordingly, by using the negative pressure adsorption operation of the first and second cavity portions 251 and 252, it is possible to improve the adhesiveness of the first and second external electrode layers 121 and 122 on the dielectric layer 110 and to obtain the capacitor 20 having excellent reliability.

Moreover, also by forming at least any one of a cavity formed between the first internal electrode portion 131 and the second external electrode layer 122 and a cavity formed between the second internal electrode portion 132 and the first external electrode layer 121 to be hollow, it is possible to obtain the negative pressure adsorption operation on the external electrode layers 121 and 122 as in the case of the adsorbing portion 250. When this embodiment is partially compared to the embodiment, this embodiment is superior to the embodiment in that the adsorbing power and adhesive force to the external electrode layers 121 and 122 are high because two adsorbing portions are formed in one through-hole.

Although embodiments of the present disclosure have been described, the present disclosure is not limited to only the above-mentioned embodiments and may be modified without departing from the gist of the present disclosure.

For example, instead of the method of forming the negative pressure space 151 (hole) described in the first embodiment, by forming a through-hole portion whose bottom is opened once, filling an insulating material in the through-hole portion to constitute the adsorbing portion 150, and removing the insulating material by an etching process or the like after an internal electrode portion is processed, a hole may be partially formed.

Moreover, the capacitor according to each of the embodiments is not limited to the case where it is implemented alone, and may be concurrently implemented. Specifically, as an adsorbing portion, a capacitor including the adsorbing portion 150 according to the first embodiment and the adsorbing portion 250 according to the second embodiment may be configured.

What is claimed is:

1. A capacitor, comprising:
    a dielectric layer including
       a first surface,
       a second surface facing the first surface, and
       a plurality of through-holes communicating between the first surface and the second surface;
    a first external electrode layer disposed on the first surface;
    a second external electrode layer disposed on the second surface;
    a first internal electrode portion provided on a first through-hole portion, the first through-hole portion being a part of the plurality of through-holes, one end of the first internal electrode portion being connected to the first external electrode layer, the other end of the first internal electrode portion being insulated from the second external electrode layer;
    a second internal electrode portion provided on a second through-hole portion, the second through-hole portion being another part of the plurality of through-holes, one end of the second internal electrode portion being connected to the second external electrode layer, the other end of the second internal electrode portion being insulated from the first external electrode layer; and
    an adsorbing portion provided on a third through-hole portion, the adsorbing portion adsorbing the first external electrode layer and the second external electrode layer, the third through-hole portion being the remaining portion of the plurality of through-holes.

2. The capacitor according to claim 1, wherein
    the adsorbing portion includes a filing body, the filling body including a first end portion and a second end portion, the first end portion facing the first external electrode layer via a first cavity portion, the second end portion facing the second external electrode layer via a second cavity portion.

3. The capacitor according to claim 2, wherein
    the filling body includes a conductor.

4. The capacitor according to claim 1, wherein
    the first external electrode layer and the second external electrode layer include a metal sputtering film.

* * * * *